United States Patent
Zeine et al.

(10) Patent No.: US 10,256,670 B2
(45) Date of Patent: Apr. 9, 2019

(54) WIRELESS POWER TRANSCEIVERS FOR SUPPLEMENTING WIRELESS POWER DELIVERY AND EXTENDING RANGE

(71) Applicant: Ossia Inc., Bellevue, WA (US)

(72) Inventors: Hatem Zeine, Bellevue, WA (US); Anas Alfarra, Bellevue, WA (US)

(73) Assignee: Ossia Inc., Bellevue, WA (US)

(*) Notice: Subject to any disclaimer, the term of this patent is extended or adjusted under 35 U.S.C. 154(b) by 460 days.

(21) Appl. No.: 15/094,079

(22) Filed: Apr. 8, 2016

(65) Prior Publication Data

US 2016/0301258 A1  Oct. 13, 2016

Related U.S. Application Data

(60) Provisional application No. 62/146,233, filed on Apr. 10, 2015.

(51) Int. Cl.
| | |
|---|---|
| *H02J 50/80* | (2016.01) |
| *H02J 50/20* | (2016.01) |
| *H02J 50/50* | (2016.01) |
| *H02J 7/02* | (2016.01) |

(52) U.S. Cl.
CPC .............. *H02J 50/20* (2016.02); *H02J 50/50* (2016.02); *H02J 7/025* (2013.01); *H02J 50/80* (2016.02)

(58) Field of Classification Search
CPC .................................. H02J 50/80; H02J 7/025
See application file for complete search history.

(56) References Cited

U.S. PATENT DOCUMENTS

| | | | |
|---|---|---|---|
| 5,982,103 A | 11/1999 | Mosebrook et al. | |
| 6,178,140 B1 | 1/2001 | Schlieter | |
| 6,448,490 B1 | 9/2002 | Katz | |
| 6,788,661 B1 * | 9/2004 | Ylitalo | H04B 7/0617 342/359 |
| 8,072,380 B2 * | 12/2011 | Crouch | H01Q 3/2647 342/370 |
| 8,310,201 B1 | 11/2012 | Wright | |
| 2003/0153266 A1 | 8/2003 | Kim et al. | |
| 2003/0220092 A1 | 11/2003 | Hethuin | |
| 2004/0209582 A1 * | 10/2004 | Liu | H04L 25/022 455/136 |
| 2005/0136845 A1 | 6/2005 | Masuoka et al. | |
| 2005/0152466 A1 * | 7/2005 | Maltsev | H04L 1/0003 375/260 |

(Continued)

FOREIGN PATENT DOCUMENTS

WO       2013142720 A1       9/2013

OTHER PUBLICATIONS

Li, et.al., "Design of Retrodirective Antenna Arrays for short-range wireless power transmission," Jan. 2012, IEEE transactions on antennas and propagation, vol. 60, No. 1, pp. 206-211.*

*Primary Examiner* — Thienvu V Tran
*Assistant Examiner* — Pinping Sun

(57) ABSTRACT

Wireless transceiver devices are disclosed herein that enhance and otherwise extend the wireless power transmission range of a retrodirective wireless power transmission system. The wireless transceiver devices can be configured to operate, in whole or in part, as additional wireless power transmission systems enhancing range of the retrodirective wireless power transmission system and/or delivering supplemental wireless power to devices within range.

20 Claims, 13 Drawing Sheets

(56) References Cited

U.S. PATENT DOCUMENTS

| | | |
|---|---|---|
| 2007/0008132 A1 | 1/2007 | Bellantoni |
| 2007/0103110 A1* | 5/2007 | Sagoo ................... H02J 7/025 320/109 |
| 2008/0217309 A1 | 9/2008 | Rodgers |
| 2010/0041349 A1 | 2/2010 | Mahany et al. |
| 2010/0178919 A1 | 7/2010 | Deepak et al. |
| 2010/0328073 A1 | 12/2010 | Nikitin et al. |
| 2011/0103517 A1 | 5/2011 | Hamalainen |
| 2011/0181237 A1* | 7/2011 | Hamedi-Hagh ........ H02J 7/025 320/108 |
| 2012/0262004 A1 | 10/2012 | Cook et al. |
| 2012/0274154 A1 | 11/2012 | DeLuca |
| 2012/0276854 A1 | 11/2012 | Joshi et al. |
| 2012/0302297 A1 | 11/2012 | Patel et al. |
| 2013/0026981 A1* | 1/2013 | Van Der Lee .......... H02J 5/005 320/108 |
| 2013/0106661 A1 | 5/2013 | Xiang |
| 2013/0154892 A1 | 6/2013 | Zeltser et al. |
| 2013/0207599 A1* | 8/2013 | Ziv ........................ H02J 5/005 320/108 |
| 2013/0273870 A1 | 10/2013 | Shi |
| 2014/0091626 A1 | 4/2014 | Walley et al. |
| 2014/0117928 A1 | 5/2014 | Liao |
| 2014/0217967 A1* | 8/2014 | Zeine ..................... H02J 7/025 320/108 |
| 2014/0268519 A1 | 9/2014 | Huang et al. |
| 2014/0302869 A1 | 10/2014 | Rosenbaum et al. |
| 2014/0336474 A1* | 11/2014 | Arbabian ................ H02J 50/05 600/301 |
| 2014/0361735 A1 | 12/2014 | Li et al. |
| 2015/0022022 A1 | 1/2015 | Zeine |

* cited by examiner

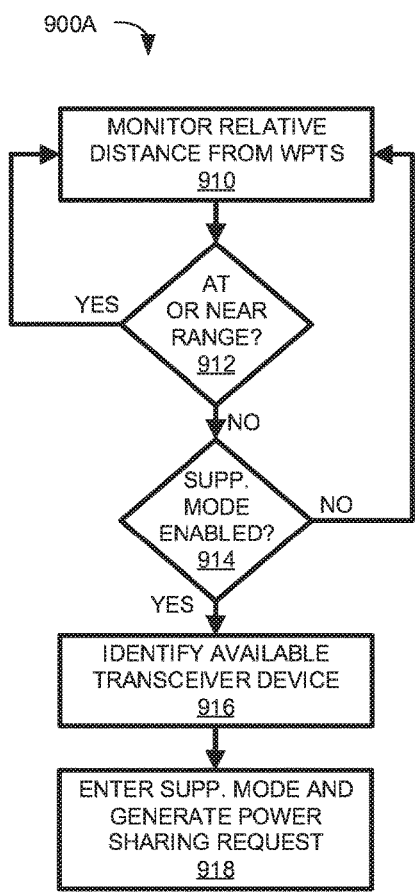 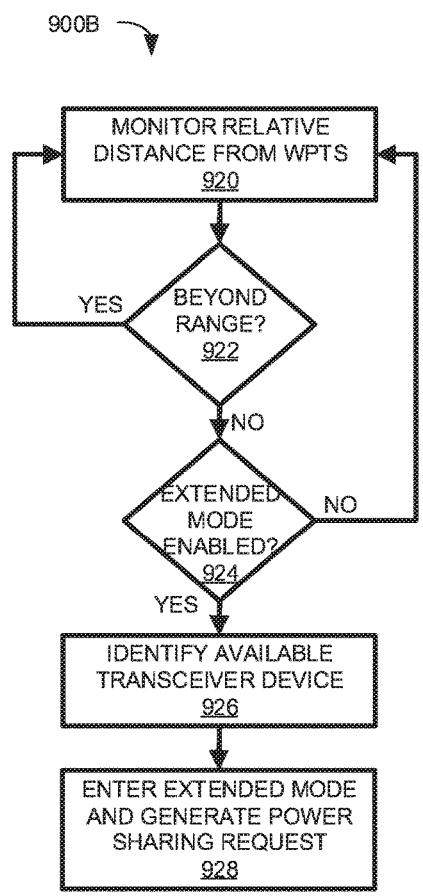
*FIG. 9A*     *FIG. 9B*

WIRELESS POWER TRANSCEIVERS FOR
SUPPLEMENTING WIRELESS POWER
DELIVERY AND EXTENDING RANGE

CROSS-REFERENCE TO RELATED APPLICATIONS

This application claims priority to and benefit from U.S. Provisional Patent Application Ser. No. 62/146,233 titled "SYSTEMS AND METHODS FOR WIRELESS CHARGING" filed on Apr. 10, 2015, which is expressly incorporated by reference herein.

TECHNICAL FIELD

The technology described herein relates generally to the field of wireless power transmission and, more specifically, to wireless power hot spots and range extension for enhanced wireless power delivery.

BACKGROUND

Many electronic devices are powered by batteries. Rechargeable batteries are often used to avoid the cost of replacing conventional dry-cell batteries and to conserve precious resources. However, recharging batteries with conventional rechargeable battery chargers requires access to an alternating current (AC) power outlet, which is sometimes not available or not convenient. It would, therefore, be desirable to derive power for electronics wirelessly.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIGS. 9A-9C depict flows diagram illustrating example processes for triggering extended or supplemental wireless power delivery modes for a wireless power transceiver apparatus in accordance with some embodiments.

DETAILED DESCRIPTION

Figure 1:
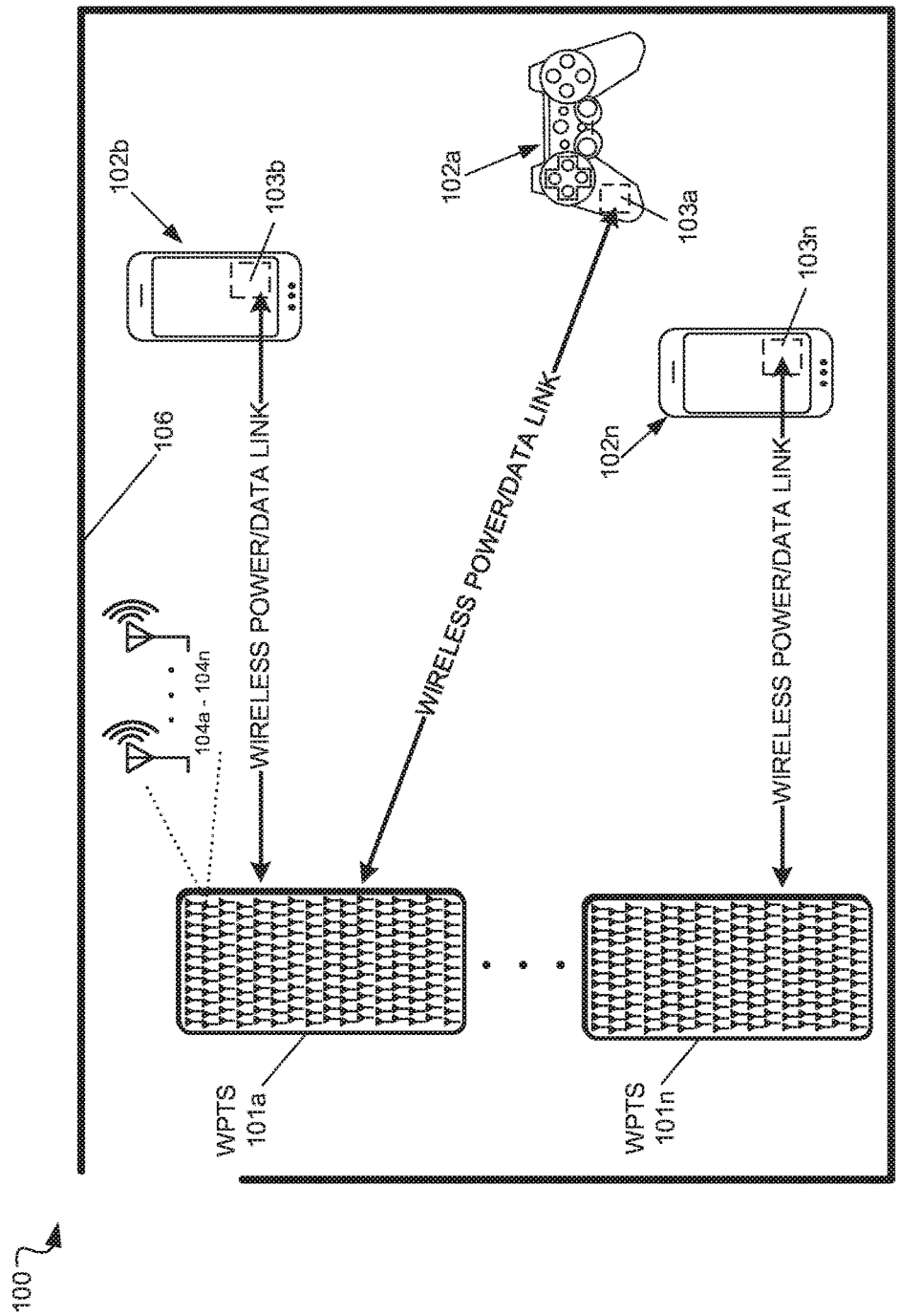
FIG. 1 depicts a block diagram including an example wireless power delivery environment illustrating wireless power delivery from one or more wireless power transmission systems to various wireless devices within the wireless power delivery environment in accordance with some embodiments.

Wireless power transmission systems have a limited wireless power transmission range. As portable wireless devices move toward the edge of a wireless power transmission range, the wireless device receives a less powerful signal from a wireless power transmission system and, consequently, less power. Furthermore, once a wireless device moves outside of a transmission range, a wireless device can no longer receive wireless power or EM energy. In some embodiments, wireless transceiver devices are disclosed herein that can act to enhance and/or otherwise extend the wireless power transmission range of a wireless power transmission system. The wireless transceiver devices can be configured to operate, in whole or in part, as additional wireless power transmission systems enhancing range of a wireless power transmission system and/or delivering supplemental wireless power to devices within range.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

1. Wireless Power Transmission System Overview/Architecture

FIG. 1 depicts a block diagram including an example wireless power delivery environment 100 illustrating wireless power delivery from one or more wireless power transmission systems (WPTS) 101$a$-$n$ (also referred to as "wireless power delivery systems", "antenna array systems" and "wireless chargers") to various wireless devices 102$a$-$n$ within the wireless power delivery environment 100, according to some embodiments. More specifically, FIG. 1 illustrates an example wireless power delivery environment 100 in which wireless power and/or data can be delivered to available wireless devices 102$a$-102$n$ having one or more wireless power receiver clients 103$a$-103$n$ (also referred to herein as "clients" and "wireless power receivers"). The wireless power receiver clients are configured to receive and process wireless power from one or more wireless power transmission systems 101$a$-101$n$. Components of an example wireless power receiver client 103 are shown and discussed in greater detail with reference to FIG. 4.

As shown in the example of FIG. 1, the wireless devices 102$a$-102$n$ include mobile phone devices and a wireless game controller. However, the wireless devices 102$a$-102$n$ can be any device or system that needs power and is capable of receiving wireless power via one or more integrated power receiver clients 103$a$-103$n$. As discussed herein, the one or more integrated power receiver clients receive and process power from one or more wireless power transmission systems 101$a$-101$n$ and provide the power to the wireless devices 102$a$-102$n$ or internal batteries of the wireless devices) for operation thereof.

Each wireless power transmission system 101 can include multiple antennas 104$a$-$n$, e.g., an antenna array including hundreds or thousands of antennas, which are capable of delivering wireless power to wireless devices 102. In some embodiments, the antennas are adaptively-phased radio frequency (RF) antennas. The wireless power transmission system 101 is capable of determining the appropriate phases with which to deliver a coherent power transmission signal to the power receiver clients 103. The array is configured to emit a signal (e.g., continuous wave or pulsed power transmission signal) from multiple antennas at a specific phase relative to each other. It is appreciated that use of the term "array" does not necessarily limit the antenna array to any specific array structure. That is, the antenna array does not need to be structured in a specific "array" form or geometry. Furthermore, as used herein the term "array" or "array system" may be used include related and peripheral circuitry for signal generation, reception and transmission, such as radios, digital logic and modems. In some embodiments, the wireless power transmission system 101 can have an embedded Wi-Fi hub for data communications via one or more antennas or transceivers.

The wireless devices 102 can include one or more receive power clients 103. As illustrated in the example of FIG. 1, power delivery antennas 104$a$-104$n$ are shown. The power delivery antennas 104$a$ are configured to provide delivery of wireless radio frequency power in the wireless power delivery environment. In some embodiments, one or more of the power delivery antennas 104$a$-104$n$ can alternatively or additionally be configured for data communications in addition to or in lieu of wireless power delivery. The one or more data communication antennas are configured to send data communications to and receive data communications from the power receiver clients 103$a$-103$n$ and/or the wireless devices 102$a$-102$n$. In some embodiments, the data communication antennas can communicate via Bluetooth, Wi-Fi, ZigBee, etc. Other data communication protocols are also possible.

Each power receiver client 103$a$-103$n$ includes one or more antennas (not shown) for receiving signals from the wireless power transmission systems 101$a$-101$n$. Likewise, each wireless power transmission system 101$a$-101$n$ includes an antenna array having one or more antennas and/or sets of antennas capable of emitting continuous wave or discrete (pulse) signals at specific phases relative to each other. As discussed above, each the wireless power transmission systems 101$a$-101$n$ is capable of determining the appropriate phases for delivering the coherent signals to the power receiver clients 102$a$-102$n$. For example, in some embodiments, coherent signals can be determined by computing the complex conjugate of a received beacon (or calibration) signal at each antenna of the array such that the coherent signal is phased for delivering power to the particular power receiver client that transmitted the beacon (or calibration) signal.

Although not illustrated, each component of the environment, e.g., wireless device, wireless power transmission system, etc., can include control and synchronization mechanisms, e.g., a data communication synchronization module. The wireless power transmission systems 101$a$-101$n$ can be connected to a power source such as, for example, a power outlet or source connecting the wireless power transmission systems to a standard or primary alternating current (AC) power supply in a building. Alternatively, or additionally, one or more of the wireless power transmission systems 101$a$-101$n$ can be powered by a battery or via other mechanisms, e.g., solar cells, etc.

The power receiver clients 102$a$-102$n$ and/or the wireless power transmission systems 101$a$-101$n$ are configured to operate in a multipath wireless power delivery environment. That is, the power receiver clients 102$a$-102$n$ and the wireless power transmission systems 101$a$-101$n$ are configured to utilize reflective objects 106 such as, for example, walls or other RF reflective obstructions within range to transmit beacon or calibration) signals and/or receive wireless power and/or data within the wireless power delivery environment. The reflective objects 106 can be utilized for multi-directional signal communication regardless of whether a blocking object is in the line of sight between the wireless power transmission system and the power receiver client.

As described herein, each wireless device 102a-102n can be any system and/or device, and/or any combination of devices/systems that can establish a connection with another device, a server and/or other systems within the example environment 100. In some embodiments, the wireless devices 102a-102n include displays or other output functionalities to present data to a user and/or input functionalities to receive data from the user. By way of example, a wireless device 102 can be, but is not limited to, a video game controller, a server desktop, a desktop computer, a computer cluster, a mobile computing device such as a notebook, a laptop computer, a handheld computer, a mobile phone, a smart phone, PDA, a Blackberry device, a Treo, and/or an iPhone, etc. By way of example and not limitation, the wireless device 102 can also be any wearable device such as watches, necklaces, rings or even devices embedded on or within the customer. Other examples of a wireless device 102 include, but are not limited to, safety sensors (e.g., fire or carbon monoxide), electric toothbrushes, electronic door lock/handles, electric light switch controller, electric shavers, etc.

Although not illustrated in the example of FIG. 1, the wireless power transmission system 101 and the power receiver clients 103a-103n can each include a data communication module for communication via a data channel. Alternatively, or additionally, the power receiver clients 103a-103n can direct the wireless devices 102.1-102.n to communicate with the wireless power transmission system via existing data communications modules. In some embodiments the beacon signal, which is primarily referred to herein as a continuous waveform, can alternatively or additionally take the form of a modulated signal.

Figure 2:
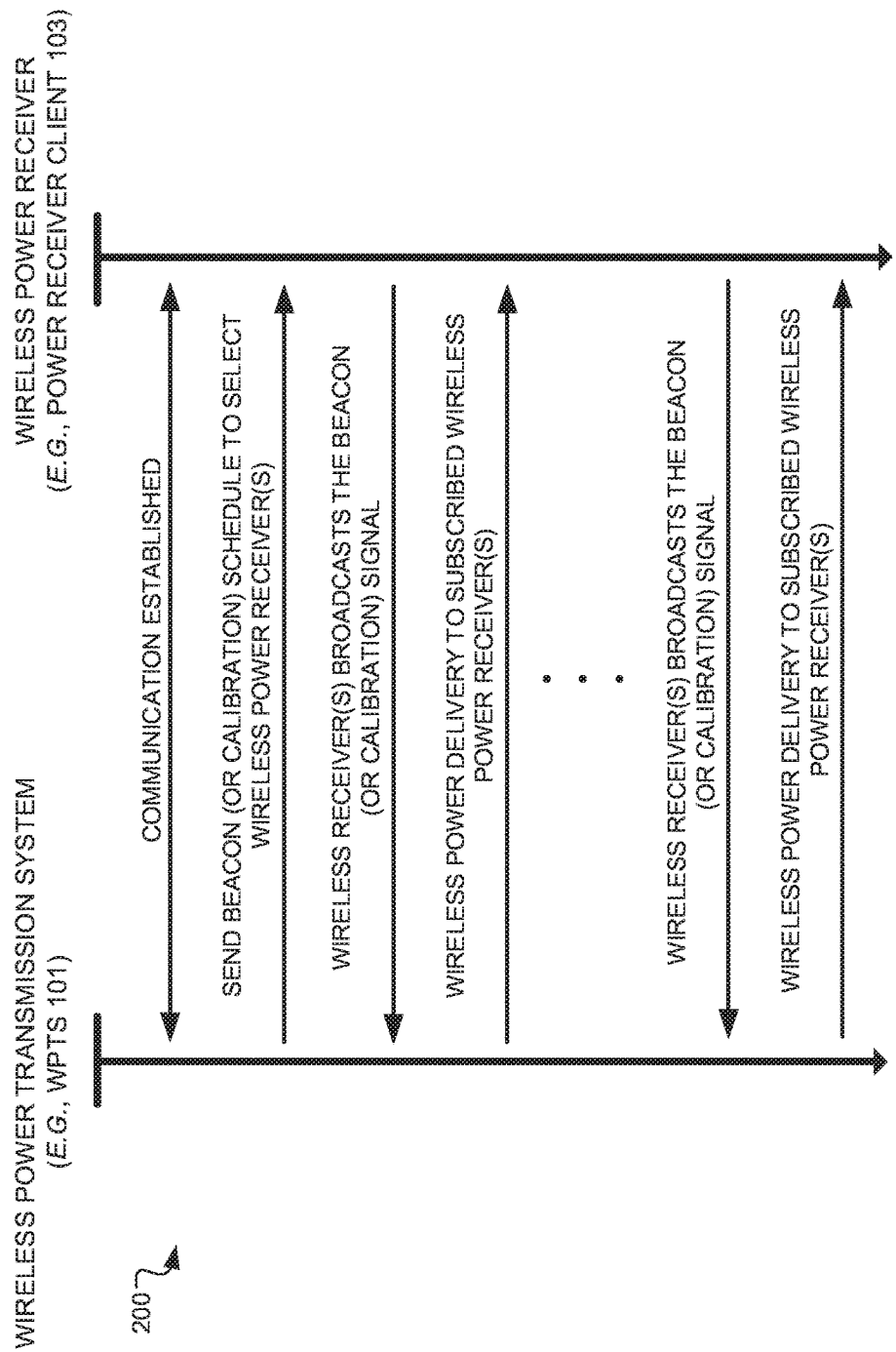
FIG. 2 depicts a sequence diagram illustrating example operations between a wireless power transmission system and a wireless receiver client for commencing wireless power delivery in accordance with some embodiments.

FIG. 2 is a sequence diagram 200 illustrating example operations between a wireless power delivery system (e.g., WPTS 101) and a wireless power receiver client (e.g., wireless power receiver client 103) for establishing wireless power delivery in a multipath wireless power delivery, according to an embodiment. Initially, communication is established between the wireless power transmission system 101 and the power receiver client 103. The initial communication can be, for example, a data communication link that is established via one or more antennas 104 of the wireless power transmission system 101. As discussed, in some embodiments, one or more of the antennas 104a-104n can be data antennas, wireless power transmission antennas, or dual-purpose data/power antennas. Various information can be exchanged between the wireless power transmission system 101 and the wireless power receiver client 103 over this data communication channel. For example, wireless power signaling can be time sliced among various clients in a wireless power delivery environment. In such cases, the wireless power transmission system 101 can send beacon schedule information, e.g., Beacon Beat Schedule (BBS) cycle, power cycle information, etc., so that the wireless power receiver client 103 knows when to transmit (broadcast) its beacon signals and when to listen for power, etc.

Continuing with the example of FIG. 2, the wireless power transmission system 101 selects one or more wireless power receiver clients for receiving power and sends the beacon schedule information to the select power receiver clients 103. The wireless power transmission system 101 can also send power transmission scheduling information so that the power receiver client 103 knows when to expect (e.g., a window of time) wireless power from the wireless power transmission system. The power receiver client 103 then generates a beacon (or calibration) signal and broadcasts the beacon during an assigned beacon transmission window (or time slice) indicated by the beacon schedule information, e.g., Beacon Beat Schedule (BBS) cycle. As discussed herein, the wireless power receiver client 103 include one or more antennas or transceivers) which have a radiation and reception pattern in three-dimensional space proximate to the wireless device 102 in which the power receiver client 103 is embedded.

The wireless power transmission system 101 receives the beacon from the power receiver client 103 and detects and/or otherwise measures the phase (or direction) from which the beacon signal is received at multiple antennas. The wireless power transmission system 101 then delivers wireless power to the power receiver client 103 from the multiple antennas 103 based on the detected or measured phase (or direction) of the received beacon at each of the corresponding antennas. In some embodiments, the wireless power transmission system 101 determines the complex conjugate of the measured phase of the beacon and uses the complex conjugate to determine a transmit phase that configures the antennas for delivering and/or otherwise directing wireless power to the power receiver client 103 via the same path over which the beacon signal was received from the power receiver client 103.

In some embodiments, the wireless power transmission system 101 includes many antennas; one or more of which are used to deliver power to the power receiver client 103. The wireless power transmission system 101 can detect and/or otherwise determine or measure phases at which the beacon signals are received at each antenna. The large number of antennas may result in different phases of the beacon signal being received at each antenna of the wireless power transmission system 101. As discussed above, the wireless power transmission system 101 can determine the complex conjugate of the beacon signals received at each antenna. Using the complex conjugates, one or more antennas may emit a signal that takes into account the effects of the large number of antennas in the wireless power transmission system 101. In other words, the wireless power transmission system 101 can emit a wireless power transmission signal from the one or more antennas in such a way as to create an aggregate signal from the one or more of the antennas that approximately recreates the waveform of the beacon in the opposite direction. Said another way, the wireless power transmission system 101 can deliver wireless RF power to the client device via the same paths over which the beacon signal is received at the wireless power transmission system 101. These paths can utilize reflective objects 106 within the environment. Additionally, the wireless power transmission signals can be simultaneously transmitted from the wireless power transmission system 101 such that the wireless power transmission signals collectively match the antenna radiation and reception pattern of the client device in a three-dimensional (3D) space proximate to the client device.

As shown, the beacon (or calibration) signals can be periodically transmitted by power receiver clients 103 within the power delivery environment according to, for example, the BBS, so that the wireless power transmission system 101 can maintain knowledge and/or otherwise track the location of the power receiver clients 103 in the wireless power delivery environment. Furthermore, as discussed herein, wireless power can be delivered in power cycles defined by power schedule information. A more detailed example of the signaling required to commence wireless power delivery is described now with reference to FIG. 3.

Figure 3:
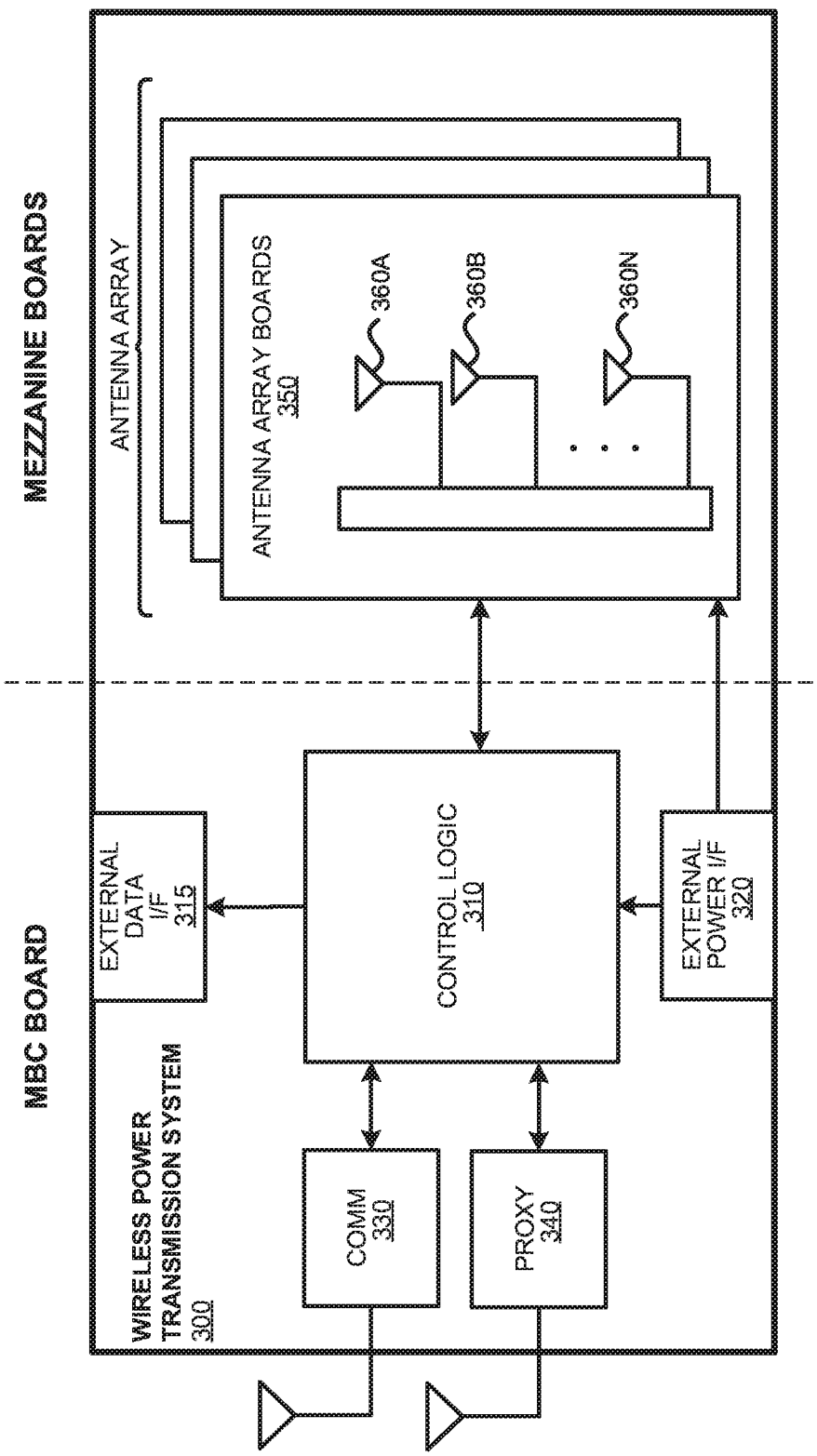
FIG. 3 depicts a block diagram illustrating example components of a wireless power transmission system in accordance with some embodiments.

FIG. 3 is a block diagram illustrating example components of a wireless power transmission system 300, in accordance with an embodiment. As illustrated in the example of FIG. 3, the wireless charger 300 includes a master bus controller (MBC) board and multiple mezzanine boards that collectively comprise the antenna array. The MBC includes control logic 310, an external data interface (I/F) 315, an external power interface (I/F) 320, a communication block 330 and proxy 340. The mezzanine (or antenna array boards 350) each include multiple antennas 360a-360n. Some or all of the components can be omitted in some embodiments. Additional components are also possible.

The control logic 310 is configured to provide control and intelligence to the array components. The control logic 310 may comprise one or more processors, FPGAs, memory units, etc., and direct and control the various data and power communications. The communication block 330 can direct data communications on a data carrier frequency, such as the base signal clock for clock synchronization. The data communications can be Bluetooth, Wi-Fi, ZigBee, etc., including combinations or variations thereof. Likewise, the proxy 340 can communicate with clients via data communications as discussed herein. The data communications can be Bluetooth, Wi-Fi, ZigBee, etc.

In some embodiments, the control logic 310 can also facilitate and/or otherwise enable data aggregation for Internet of Things (IoT) devices. In some embodiments, wireless power receiver clients can access, track and/or otherwise obtain IoT information about the device in which the wireless power receiver client is embedded and provide that IoT information to the wireless power transmission system 300 over a data connection. This IoT information can be provided to via an external data interface 315 to a central or cloud-based system (not shown) where the data can be aggregated, processed, etc. For example, the central system can process the data to identify various trends across geographies, wireless power transmission systems, environments, devices, etc. In some embodiments, the aggregated data and or the trend data can be used to improve operation of the devices via remote updates, etc. Alternatively, or additionally, in some embodiments, the aggregated data can be provided to third party data consumers. In this manner, the wireless power transmission system acts as a Gateway or Enabler for the IoTs. By way of example and not limitation, the IoT information can include capabilities of the device in which the wireless power receiver client is embedded, usage information of the device, power levels of the device, information obtained by the device or the wireless power receiver client itself, e.g., via sensors, etc.

The external power interface 320 is configured to receive external power and provide the power to various components. In some embodiments, the external power interface 320 may be configured to receive a standard external 24 Volt power supply. Alternative configurations are also possible.

An example of a system power cycle is now described. In this example, the master bus controller (MBC), which controls the wireless power transmission system, first receives power from a power source and is activated. The MBC then activates the proxy antenna elements on the wireless power transmission system and the proxy antenna elements enter a default "discovery" mode to identify available wireless receiver clients within range of the wireless power transmission system. When a client is found, the antenna elements on the wireless power transmission system power on, enumerate, and (optionally) calibrate.

The MBC then generates beacon transmission scheduling information and power transmission scheduling information during a scheduling process. The scheduling process includes selection of power receiver clients. For example, the MBC can select power receiver clients for power transmission and generate a Beacon Beat Schedule (BBS) cycle and a Power Schedule (PS) for the selected wireless power receiver clients. As discussed herein, the power receiver clients can be selected based on their corresponding properties and/or requirements.

In some embodiments, the MBC can also identify and/or otherwise select available clients that will have their status queried in the Client Query Table (CQT). Clients that are placed in the CQT are those on "standby", e.g., not receiving a charge. The BBS and PS are calculated based on vital information about the clients such as, for example, battery status, current activity/usage, how much longer the client has until it runs out of power, priority in terms of usage, etc.

The Proxy AE broadcasts the BBS to all clients. As discussed herein, the BBS indicates when each client should send a beacon. Likewise, the PS indicates when and to which clients the array should send power to and when clients should listen for wireless power. Each client starts broadcasting its beacon and receiving power from the array per the BBS and PS. The Proxy can concurrently query the Client Query Table to check the status of other available clients. In some embodiments, a client can only exist in the BBS or the CQT (e.g., waitlist), but not in both. A limited number of clients can be served on the BBS and PS (e.g., 32). Likewise, the CQT may also be limited to a number of clients (e.g., 32). Thus, for example, if more than 64 clients are within range of the wireless power transmission system, some of those clients would not be active either the BBS or CQT. The information collected in the previous step continuously and/or periodically updates the BBS cycle and/or the PS.

Figure 4:
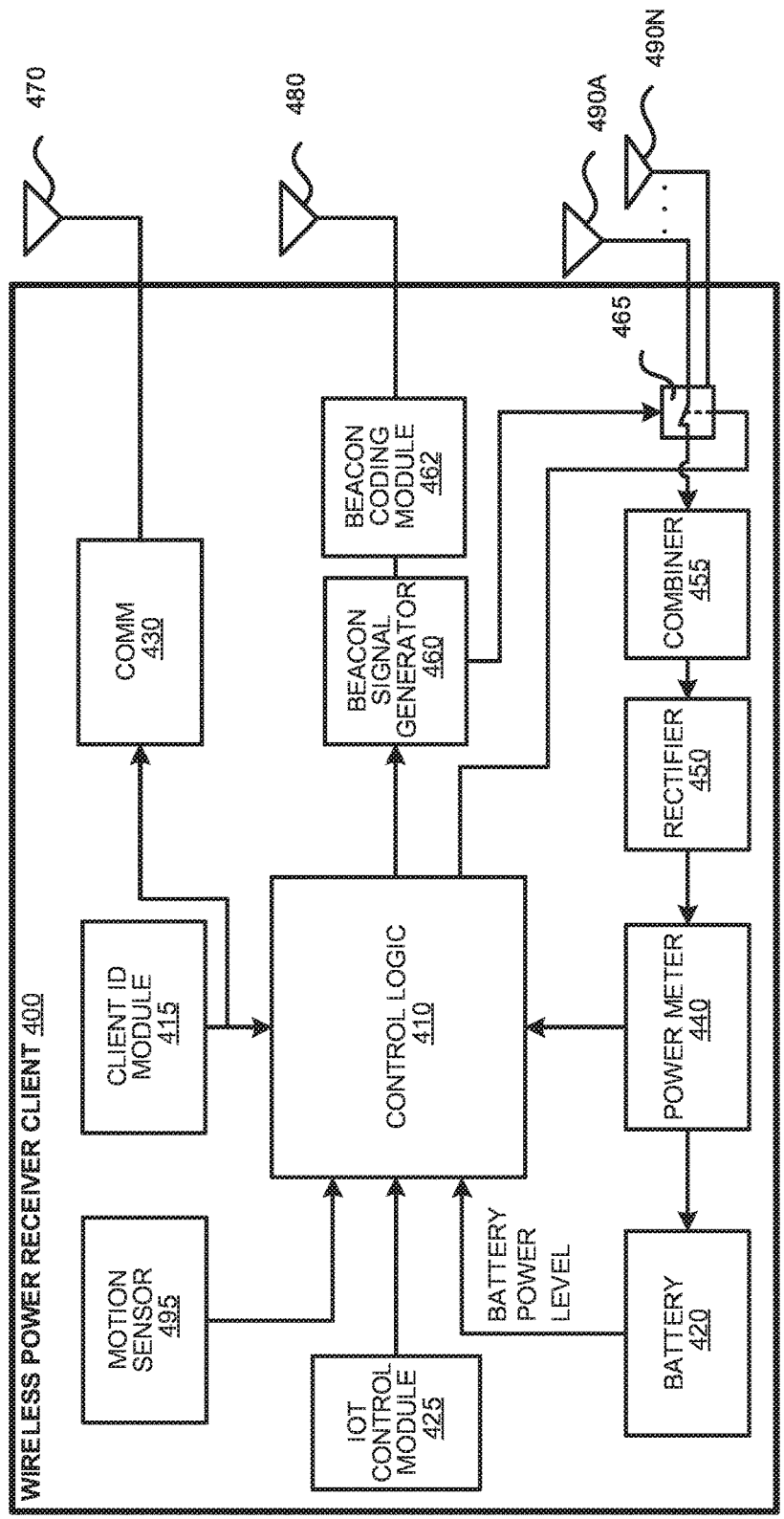
FIG. 4 depicts a block diagram illustrating example components of a wireless power receiver client in accordance with some embodiments.

FIG. 4 is a block diagram illustrating example components of a wireless power receiver client, in accordance with some embodiments. As illustrated in the example of FIG. 4, the receiver 400 includes control logic 410, battery 420, an IoT control module 425, communication block 430 and associated antenna 470, power meter 440, rectifier 450, a combiner 455, beacon signal generator 460, beacon coding unit 462 and an associated antenna 480, and switch 465 connecting the rectifier 450 or the beacon signal generator 460 to one or more associated antennas 490a-n. Some or all of the components can be omitted in some embodiments. For example, in some embodiments, the wireless power receiver client does not include its own antennas but instead utilizes and/or otherwise shares one or more antennas (e.g., Wi-Fi antenna) of the wireless device in which the wireless power receiver client is embedded. Moreover, in some embodiments, the wireless power receiver client may include a single antenna that provides data transmission functionality as well as power/data reception functionality. Additional components are also possible.

A combiner 455 receives and combines the received power transmission signals from the power transmitter in the event that the receiver 400 has more than one antenna. The combiner can be any combiner or divider circuit that is configured to achieve isolation between the output ports while maintaining a matched condition. For example, the combiner 455 can be a Wilkinson Power Divider circuit. The rectifier 450 receives the combined power transmission signal from the combiner 455, if present, which is fed through the power meter 440 to the battery 420 for charging. The power meter 440 can measure the received power signal strength and provides the control logic 410 with this measurement.

The control logic 410 can receive the battery power level from the battery 420 itself. The control logic 410 may also transmit/receive via the communication block 430 a data signal on a data carrier frequency, such as the base signal clock for clock synchronization. The beacon signal generator 460 generates the beacon signal, or calibration signal, transmits the beacon signal using either the antenna 480 or 490 after the beacon signal is encoded.

It may be noted that, although the battery 420 is shown for as charged by and providing power to the receiver 400, the receiver may also receive its power directly from the rectifier 450. This may be in addition to the rectifier 450 providing charging current to the battery 420, or in lieu of providing charging. Also, it may be noted that the use of multiple antennas is one example of implementation and the structure may be reduced to one shared antenna.

In some embodiments, the control logic 410 and/or the IoT control module 425 can communicate with and/or otherwise derive IoT information from the device in which the wireless power receiver client 400 is embedded. Although not shown, in some embodiments, the wireless power receiver client 400 can have one or more data connections (wired or wireless) with the device in which the wireless power receiver client 400 is embedded over which IoT information can be obtained. Alternatively, or additionally, IoT information can be determined and/or inferred by the wireless power receiver client 400, e.g., via one or more sensors. As discussed above, the IoT information can include, but is not limited to, information about the capabilities of the device in which the wireless power receiver client is embedded, usage information of the device in which the wireless power receiver client is embedded, power levels of the battery or batteries of the device in which the wireless power receiver client is embedded, and/or information obtained or inferred by the device in which the wireless power receiver client is embedded or the wireless power receiver client itself, e.g., via sensors, etc.

In some embodiments, a client identifier (ID) module 415 stores a client ID that can uniquely identify the power receiver client in a wireless power delivery environment. For example, the ID can be transmitted to one or more wireless power transmission systems when communication is established. In some embodiments, power receiver clients may also be able to receive and identify other power receiver clients in a wireless power delivery environment based on the client ID.

An optional motion sensor 495 can detect motion and signal the control logic 410 to act accordingly. For example, when a device is receiving power at high frequencies, e.g., above 500 MHz, its location may become a hotspot of (incoming) radiation. Thus, when the device is on a person, e.g., embedded in a mobile device, the level of radiation may exceed acceptable radiation levels set by the Federal Communications Commission (FCC) or other medical/industrial authorities. To avoid any potential radiation issue, the device may integrate motion detection mechanisms such as accelerometers or equivalent mechanisms. Once the device detects that it is in motion, it may be assumed that it is being handled by a user, and would trigger a signal to the array either to stop transmitting power to it, or to lower the received power to an acceptable fraction of the power. In cases where the device is used in a moving environment like a car, train or plane, the power might only be transmitted intermittently or at a reduced level unless the device is close to losing all available power.

Figure 5A:
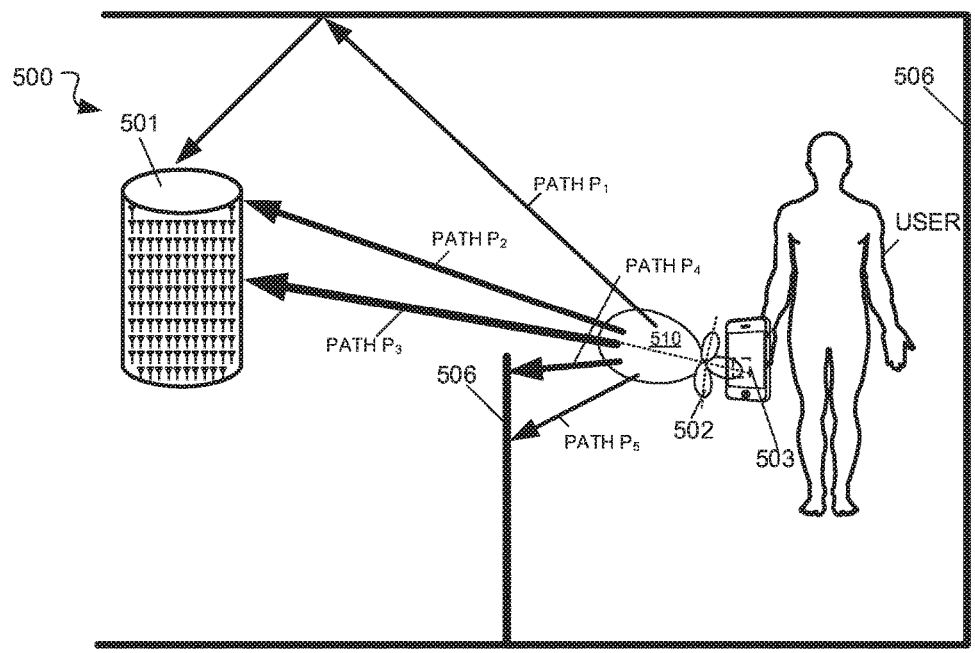
FIGS. 5A and 5B depict diagrams illustrating an example multipath wireless power delivery environment in accordance with some embodiments.
Figure 5B:
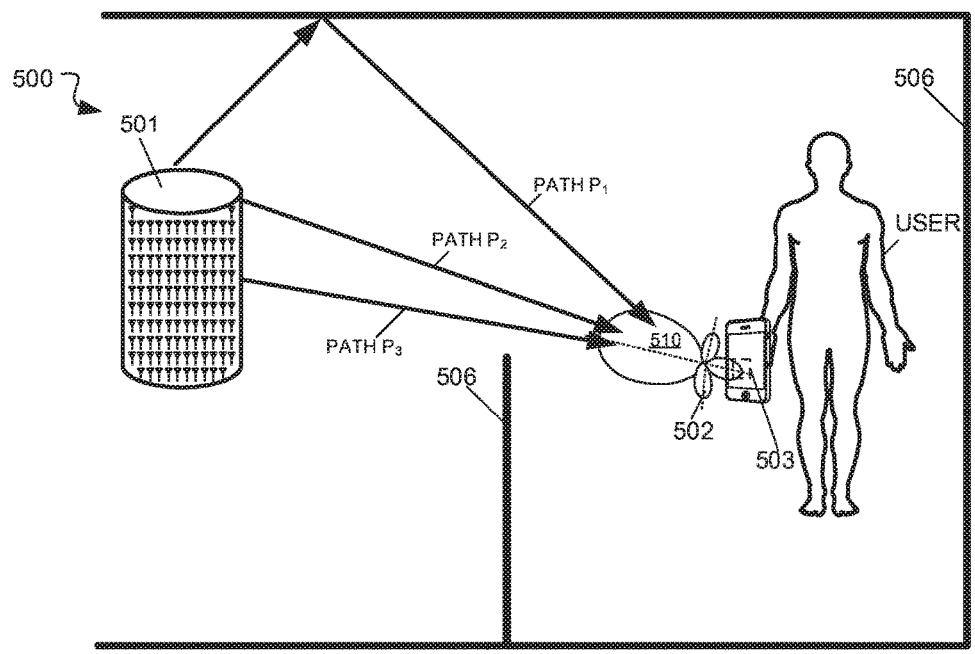

FIGS. 5A and 5B depict diagrams illustrating an example multipath wireless power delivery environment 500, according to some embodiments. The multipath wireless power delivery environment 500 includes a user operating a wireless device 502 including one or more wireless power receiver clients 503. The wireless device 502 and the one or more wireless power receiver clients 503 can be wireless device 102 of FIG. 1 and wireless power receiver client 103 of FIG. 1 or wireless power receiver client 400 of FIG. 4, respectively, although alternative configurations are possible. Likewise, wireless power transmission system 501 can be wireless power transmission system 101 FIG. 1 or wireless power transmission system 300 of FIG. 3, although alternative configurations are possible. The multipath wireless power delivery environment 500 includes reflective objects 506 and various absorptive objects, e.g., users, or humans, furniture, etc.

Wireless device 502 includes one or more antennas (or transceivers) that have a radiation and reception pattern 510 in three-dimensional space proximate to the wireless device 102. The one or more antennas (or transceivers) can be wholly or partially included as part of the wireless device 102 and/or the wireless power receiver client (not shown). For example, in some embodiments one or more antennas, e.g., Wi-Fi, Bluetooth, etc. of the wireless device 502 can be utilized and/or otherwise shared for wireless power reception. As shown in the example of FIGS. 5A and 5B, the radiation and reception pattern 510 comprises a lobe pattern with a primary lobe and multiple side lobes. Other patterns are also possible.

The wireless device 502 transmits a beacon (or calibration) signal over multiple paths to the wireless power transmission system 501. As discussed herein, the wireless device 502 transmits the beacon in the direction of the radiation and reception pattern 510 such that the strength of the received beacon signal by the wireless power transmission system, e.g., RSSI, depends on the radiation and reception pattern 510. For example, beacon signals are not transmitted where there are nulls in the radiation and reception pattern 510 and beacon signals are the strongest at the peaks in the radiation and reception pattern 510, e.g., peak of the primary lobe. As shown in the example of FIG. 5A, the wireless device 502 transmits beacon signals over five paths P1-P5. Paths P4 and P5 are blocked by reflective and/or absorptive object 506. The wireless power transmission system 501 receives beacon signals of increasing strengths via paths P1-P3. The bolder lines indicate stronger signals. In some embodiments the beacon signals are directionally transmitted in this manner to, for example, avoid unnecessary RF energy exposure to the user.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIGS. 5A and 5B, the radiation and reception pattern 510 is a three-dimensional lobe shape. However, the radiation and reception pattern 510 can be any number of shapes depending on the type or types, e.g., horn antennas, simple vertical antenna, etc. used in the antenna design. For example, the radiation and reception pattern 510 can comprise various directive patterns. Any number of different antenna radiation and reception patterns are possible for each of multiple client devices in a wireless power delivery environment.

Referring again to FIG. 5A, the wireless power transmission system 501 receives the beacon (or calibration) signal via multiple paths P1-P3 at multiple antennas or transceivers. As shown, paths P2 and P3 are direct line of sight paths while path P1 is a non-line of sight path. Once the beacon (or calibration) signal is received by the wireless power transmission system 501, the power transmission system 501 processes the beacon (or calibration) signal to determine one or more receive characteristics of the beacon signal at each of the multiple antennas. For example, among other operations, the wireless power transmission system 501 can measure the phases at which the beacon signal is received at each of the multiple antennas or transceivers.

The wireless power transmission system 501 processes the one or more receive characteristics of the beacon signal at each of the multiple antennas to determine or measure one or more wireless power transmit characteristics for each of the multiple RF transceivers based on the one or more receive characteristics of the beacon (or calibration) signal as measured at the corresponding antenna or transceiver. By way of example and not limitation, the wireless power transmit characteristics can include phase settings for each antenna or transceiver, transmission power settings, etc.

As discussed herein, the wireless power transmission system 501 determines the wireless power transmit characteristics such that, once the antennas or transceivers are configured, the multiple antennas or transceivers are operable to transit a wireless power signal that matches the client radiation and reception pattern in the three-dimensional space proximate to the client device. FIG. 5B illustrates the wireless power transmission system 501 transmitting wireless power via paths P1-P3 to the wireless device 502. Advantageously, as discussed herein, the wireless power signal matches the client radiation and reception pattern 510 in the three-dimensional space proximate to the client device. Said another way, the wireless power transmission system will transmit the wireless power signals in the direction in which the wireless power receiver has maximum gain, e.g., will receive the most wireless power. As a result, no signals are sent in directions in which the wireless power receiver cannot receiver, e.g., nulls and blockages. In some embodiments, the wireless power transmission system 501 measures the RSSI of the received beacon signal and if the beacon is less than a threshold value, the wireless power transmission system will not send wireless power over that path.

The three paths shown in the example of FIGS. 5A and 5B are illustrated for simplicity, it is appreciated that any number of paths can be utilized for transmitting power to the wireless device 502 depending on, among other factors, reflective and absorptive objects in the wireless power delivery environment.

II. Hot Spots and Range Extension for Wireless Power Delivery

Figure 6:
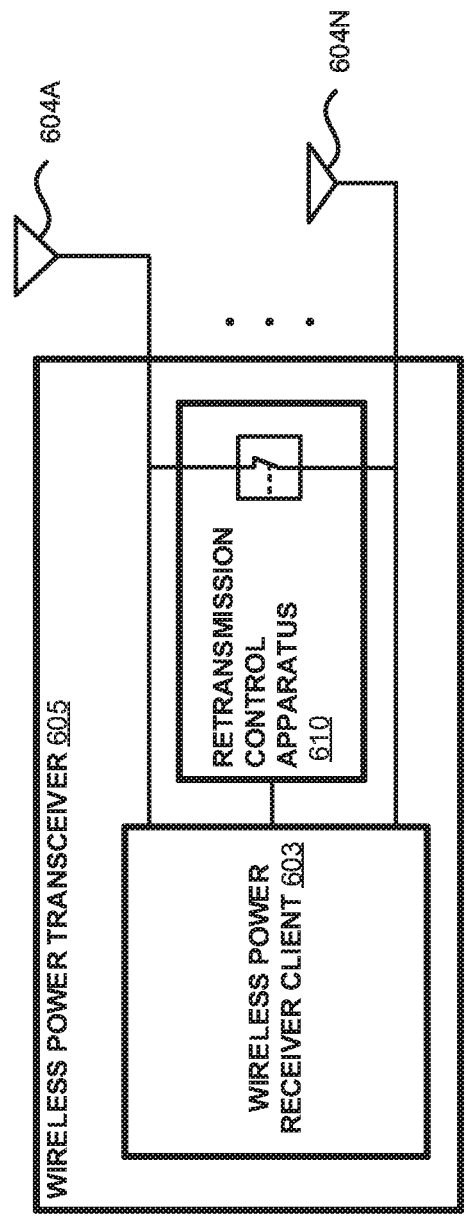
FIG. 6 depicts a system diagram illustrating example components of a wireless power transceiver in accordance with some embodiments.

FIG. 6 depicts a system diagram illustrating example components of a wireless power transceiver 605, according to some embodiments. As shown in the example of FIG. 6, the wireless power transceiver 605 includes a wireless power receiver client 603 and a retransmission control apparatus 610. The wireless power transceiver 605 can be embedded in and/or otherwise associated with a wireless transceiver device (not shown). A wireless transceiver device can be any wireless device e.g., wireless device 102 of FIG. 1 having one or more embedded and/or associated wireless power transceivers, although alternative configurations are possible. The wireless power receiver client 603 can be wireless power receiver client 103 of FIG. 1 or wireless power receiver client 400 of FIG. 4, respectively, although alternative configurations are possible.

The wireless power transceiver 605 can include one or more antenna as 604A-N configured for power and data reception and transmission. The one or more antennas 604A-N can be antennas 104 of FIG. 1 or antennas 490 of FIG. 4, although alternative configurations are possible. As discussed herein, the wireless power receiver client 603 can direct at least one of the one or more antennas 604A-N to receive wireless power transmitted by a wireless power transmission system. The wireless power receiver client 603 processes the wireless power and provides at least a portion of the wireless power to a wireless power transceiver device associated with the wireless power transceiver 605.

Among other functions and features, the retransmission control apparatus 610 is configured to direct at least one of the one or more antennas 604A-N to retransmit at least a portion of the wireless power received from the wireless power transmission system to a wireless device having a built-in and/or otherwise embedded wireless power receiver client, e.g., wireless device 102 of FIG. 1 having embedded wireless power receiver client 103. As discussed herein, the retransmission control apparatus 610 can operate in a various modes including but not limited to an extended range power delivery mode and a supplemental power delivery mode. Although not discussed, combinations and/or variation of these modes including hybrid modes are possible.

Figure 7A:
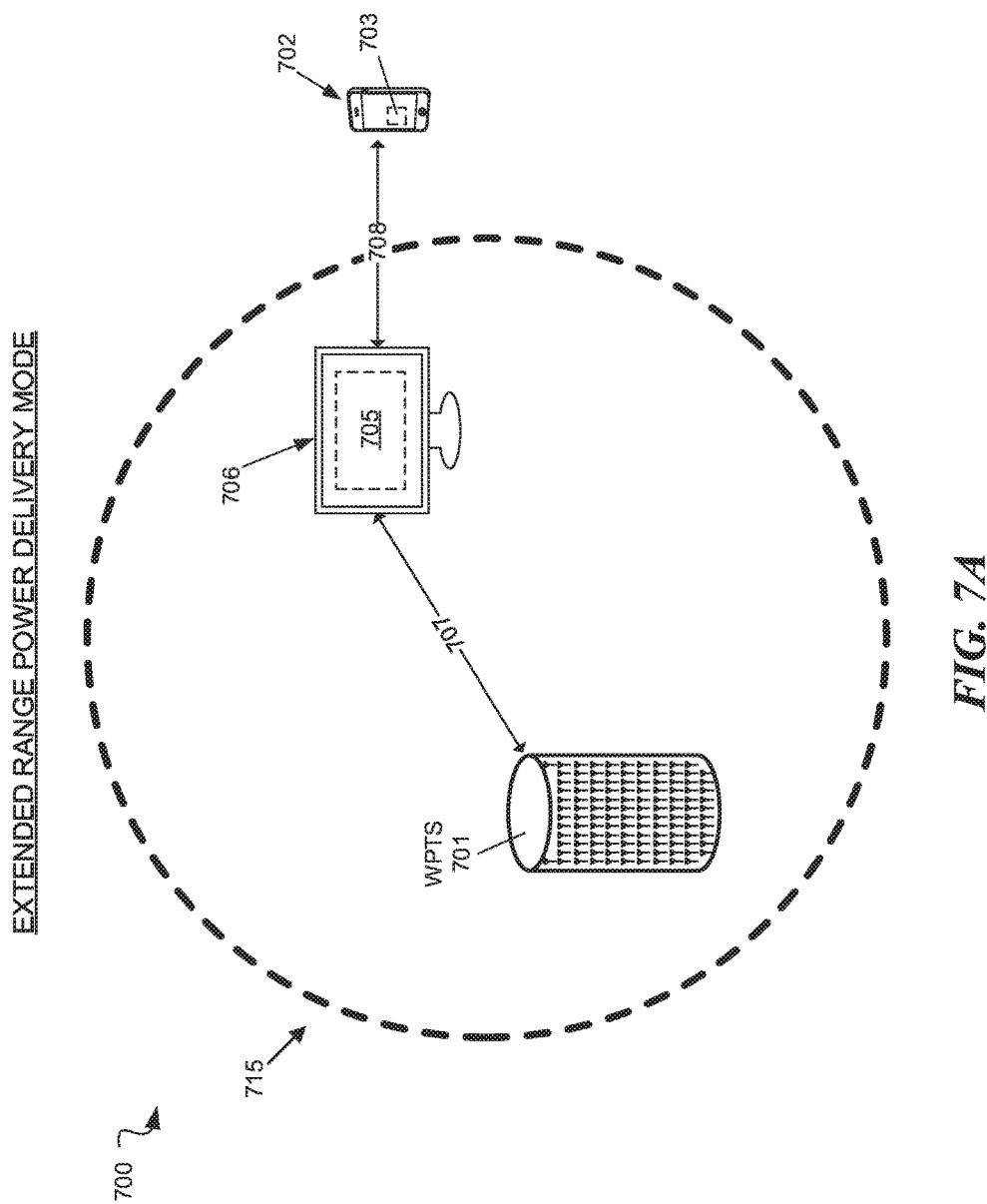
FIGS. 7A and 7B depict diagrams illustrating an example wireless power delivery environment in accordance with some embodiments.
Figure 7B:
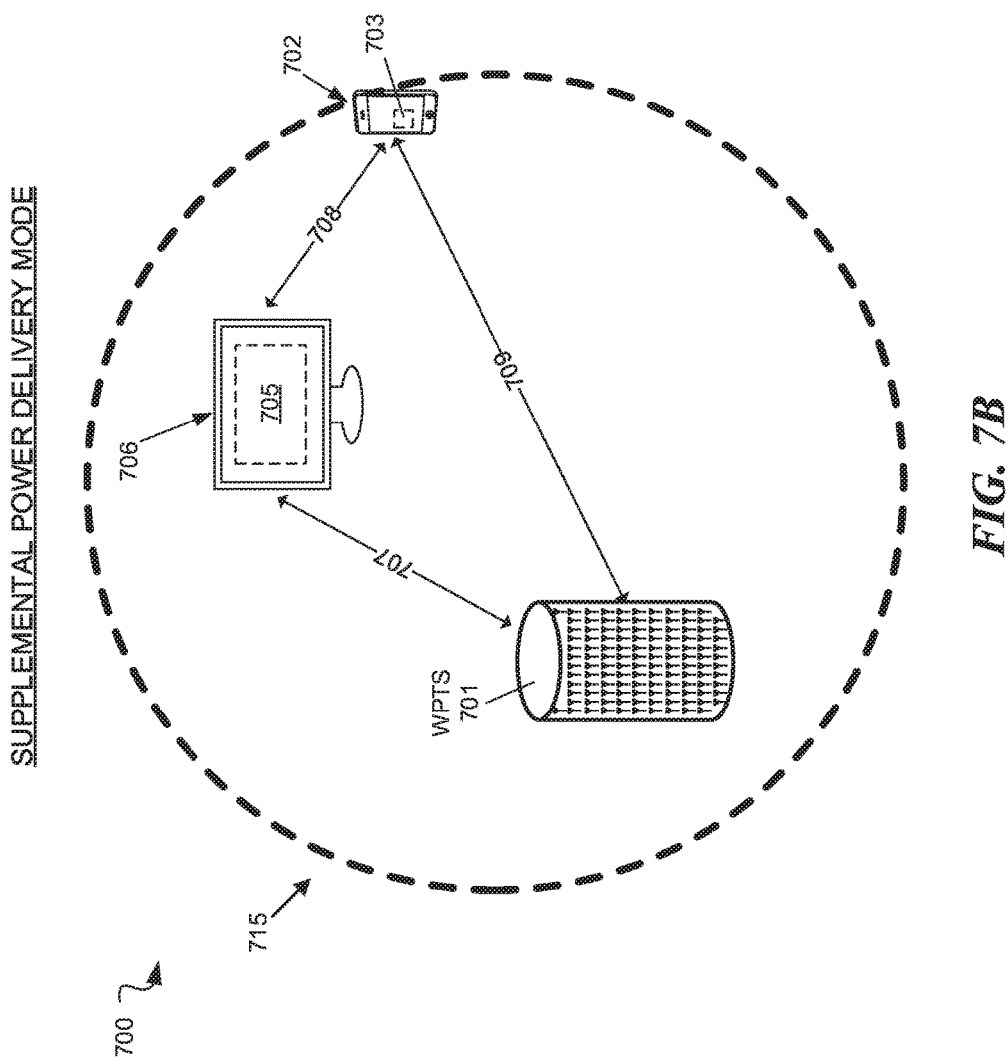

FIGS. 7A and 7B depict diagrams illustrating an example wireless power delivery environment 700, according to some embodiments. More specifically, the examples of FIG. 7A and 7B depict an example wireless power transceiver device 706 in the form of a light emitting diode (LED) or liquid crystal display (LCD) monitor operating to extend and supplement wireless power delivery to a wireless device 702, respectively. The wireless power transceiver device 706 has an embedded wireless power transceiver 705. The wireless power transceiver 705 can be wireless power transceiver 605 of FIG. 6, although alternative configurations are possible. The wireless power delivery environment 700 can be a multipath environment including various reflective and absorptive objects (not shown). As shown in the examples of FIGS. 7A and 7B, the wireless power transmission system 701 has a wireless power transmission range 715.

FIG. 7A illustrates an extended range power delivery mode of a wireless power transceiver device 706 where a wireless device 702 is located outside of the transmission range 715 of the wireless power transmission system 701. More specifically, in the example of FIG. 7A, the wireless power transceiver 705 operates to receive wireless power from a wireless power transmission system 701 over multiple power delivery paths 707 and to retransmit at least a portion of that wireless power to wireless device 703 and, more particularly, wireless power receiver client 703, over one or more wireless paths 708. As discussed, wireless device 702 is outside of wireless power transmission range 715 and, thus, could not otherwise receive wireless power.

FIG. 7B illustrates an example supplemental power delivery mode of a wireless power transceiver device 706. The example of FIG. 7B is similar to the example of FIG. 7A with the exception that the wireless device 702 is located within the wireless power transmission range 715. More specifically, in the example of FIG. 7B, the wireless device 702 is located at the edge the wireless power transmission range 715. The wireless device 702 is receiving wireless power from the wireless power transmission system 701 and supplemental wireless power over one or more wireless paths 708.

Figure 8:
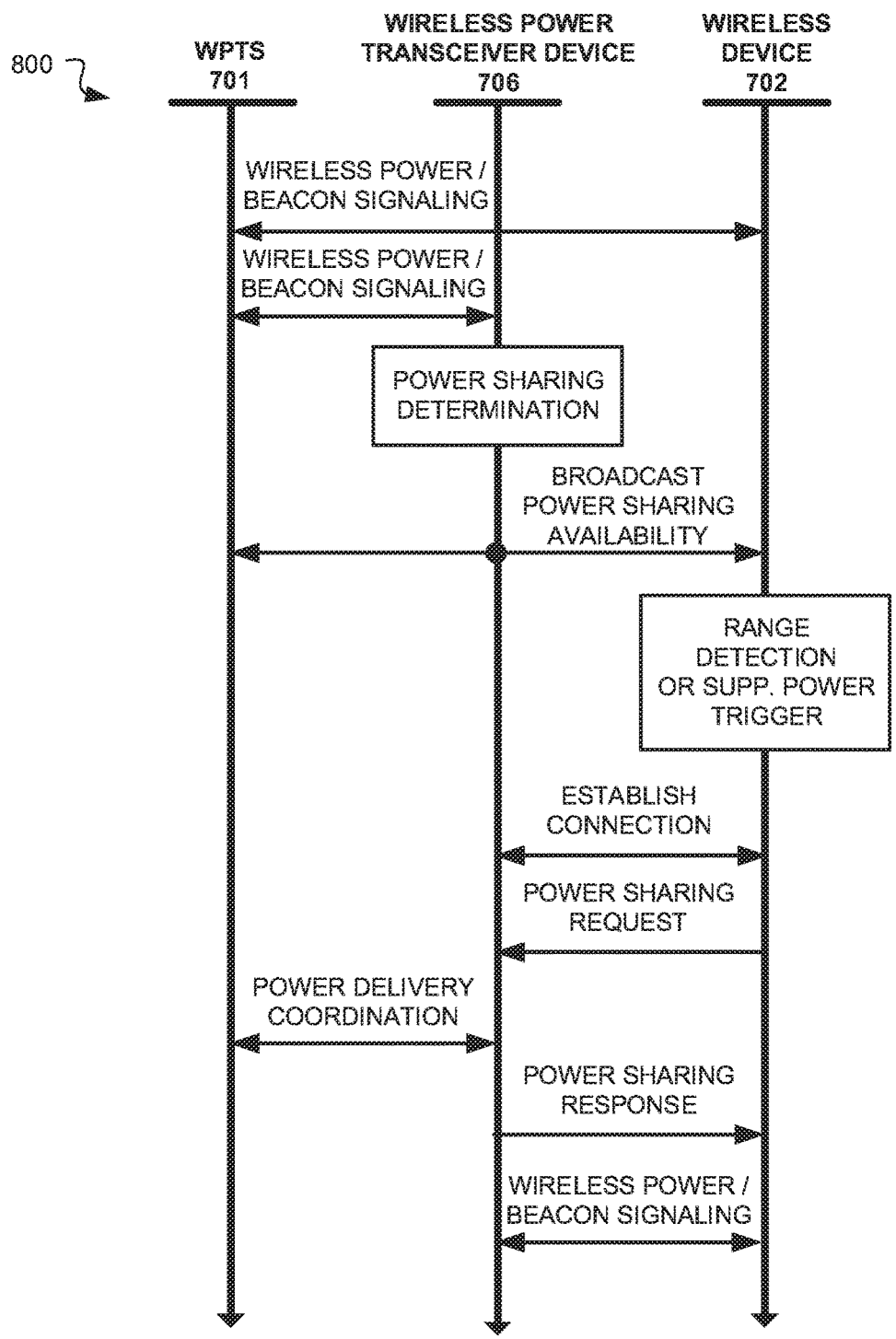
FIG. 8 depicts a sequence diagram illustrating example operations for extending and supplementing wireless power delivery in accordance with some embodiments.

To further illustrate the operation of example systems 701, 702 and 706, FIG. 8 is provided. FIG. 8 depicts a sequence diagram 800 illustrating example operations for extending and supplementing wireless power delivery, according to some embodiments.

To begin, communication is established as discussed above with reference to FIGS. 1-5. Beacon signals are then periodically transmitted by the wireless device 702 and the wireless power transceiver device 706 to the retrodirective wireless power transmission system 701 during their respective beacon scheduling time periods. Likewise, the wireless power transmission system 701 periodically transmits wireless power to the wireless device 702 and the wireless power transceiver device 706 during the respective scheduled power delivery time periods.

Once power is received, the wireless power transceiver device 706 can measure a rate at which wireless power is being received from the wireless power transmission system 701 and determine if the rate at which wireless power is being received from the wireless power transmission system 701 exceeds a threshold value. The threshold value can be, for example, a minimum rate at which power should be received in order to continue operating the electronic device associated with the wireless power transceiver apparatus. In some embodiments, if the rate at which wireless power is being received from the wireless power transmission system 701 exceeds a threshold value then the wireless power transceiver device 706 can broadcast a power sharing availability message.

As illustrated in the example of FIG. 8, the wireless device 702 receives and saves the power sharing availability message. In some embodiments, the wireless device 702 may consider the message 'valid' for a predetermined period of time after which the message may become 'stale'. As the wireless device 702 moves toward the edge of the wireless power range, a range detection or supplemental power trigger may be generated. Various examples of triggering are shown and discussed in greater detail with reference to FIGS. 9A-9C. By way of example and not limitation, a trigger can occur if the location of the device is determined to be at, near or outside of the wireless power transmission range 715. The example of FIG. 8 illustrates the wireless device 702 making this determination, however, in some embodiments, a wireless power transceiver device 706 can alternatively or additionally track the relative location of the wireless 702 to determine where the device is relative to the wireless power transmission range 715. In some embodiments, a trigger may be generated if a rate of received wireless power at the wireless device 702 drops below a threshold rate value. Alternatively, or additionally, a trigger may be generated if, for example, a battery of the wireless device 702 drops below a threshold charge value, e.g., less than ten percent charge.

Once a range detection or supplemental power trigger occurs, wireless device 702 can establish a connection with the wireless power transceiver device 706 and send a power sharing request. In some embodiments, the power sharing request can indicate how much power is needed, whether the wireless device is seeking an extended range power delivery mode or a supplemental power mode, etc. In some embodiments, the wireless power transceiver device 706 can coordinate with the wireless power transmission system 701. For example, the wireless power transceiver device 706 might seek to transmit wireless power during the power schedule assigned to the wireless device 702. Alternatively, the wireless power transmission system 701 can schedule power delivery to another wireless device that is not located near the wireless device 702 so that the wireless power transceiver device 702 can use that scheduled time to transmit additional power to the wireless device 702.

In some embodiments, the wireless power transceiver device 706 can response to the power sharing request with a power sharing response. The response can include power and/or beacon scheduling information so the wireless device 702 directs its beacon signals to the wireless power transceiver device 706. Other configuration information may also be included. Lastly, wireless power is transmitted from the wireless power transceiver device to the wireless device 702.

Figure 9C:
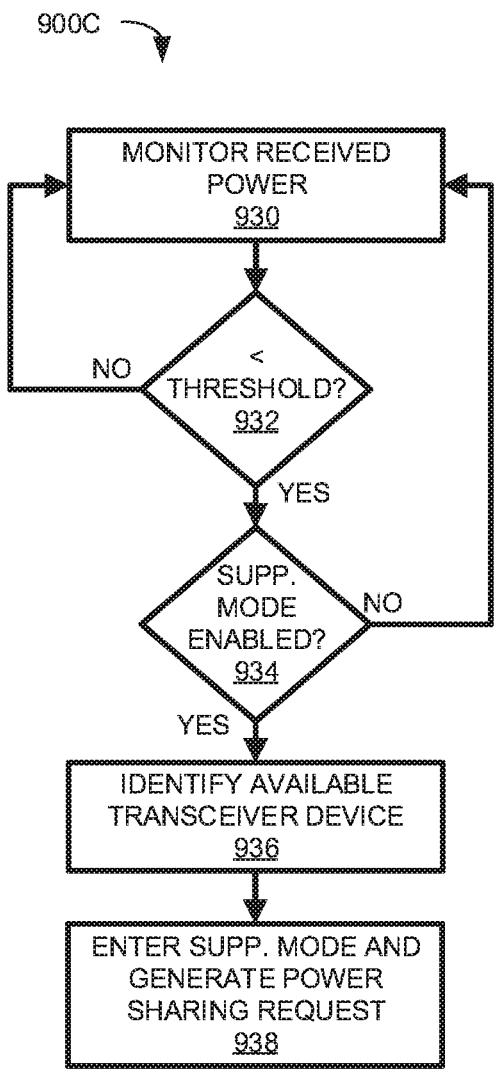

FIGS. 9A-9C depict flows diagram illustrating example processes 900A-900C for triggering extended or supplemental wireless power delivery modes for a wireless power transceiver apparatus, according to some embodiments. More specifically, processes 900A and 900C depict triggering of a supplemental power delivery mode and process 900B depicts triggering an extended range power delivery mode. A wireless device such as, for example, wireless device 702 can, among other functions, perform the example processes 900A-900C.

Referring first to FIG. 9A, at step 910, the wireless device monitors the relative distance from a wireless power transmission system. At decision step 912, the wireless device determines if its location is at or near the range of the wireless power transmission system. For example, the wireless device can measure the signal strength, e.g., RSSI, of the received wireless power signal to determine a distance to the wireless power transmission system. If the location is at or near the range, at decision step 914, the wireless device determines if supplemental mode is enabled. If supplemental mode is enabled, at step 916, the wireless device identifies an available wireless power transceiver device. For example, the wireless device can identify the available wireless power transceiver device or devices based on received power sharing availability messages. Lastly, at step 918, the wireless device enters the supplemental mode and generates a power sharing request.

Referring next to FIG. 9B, at step 920, the wireless device monitors the relative distance from a wireless power transmission system. At decision step 922, the wireless device determines if its location is beyond the range of the wireless power transmission system. For example, the wireless device can measure the signal strength, e.g., RSSI, of the received wireless power signal to determine a distance to the wireless power transmission system. If the location is beyond the range, at decision step 924, the wireless device determines if extended power mode is enabled. If the extended power mode is enabled, at step 926, the wireless device identifies an available wireless power transceiver device. For example, the wireless device can identify the available wireless power transceiver device or devices based on received power sharing availability messages. Lastly, at step 928, the wireless device enters the supplemental mode and generates a power sharing request.

Referring next to FIG. 9C, at step 930, the wireless device monitors a rate of received wireless power from the wireless power transmission system. At decision step 932, the wireless device determines if the rate drops below a threshold rate value. If the rate drops below the threshold rate value, at decision step 934, the wireless device determines if supplemental mode is enabled. If supplemental mode is enabled, at step 936, the wireless device identifies an available wireless power transceiver device. For example, the wireless device can identify the available wireless power transceiver device or devices based on received power sharing availability messages. Lastly, at step 938, the wireless device enters the supplemental mode and generates a power sharing request.

Figure 10:
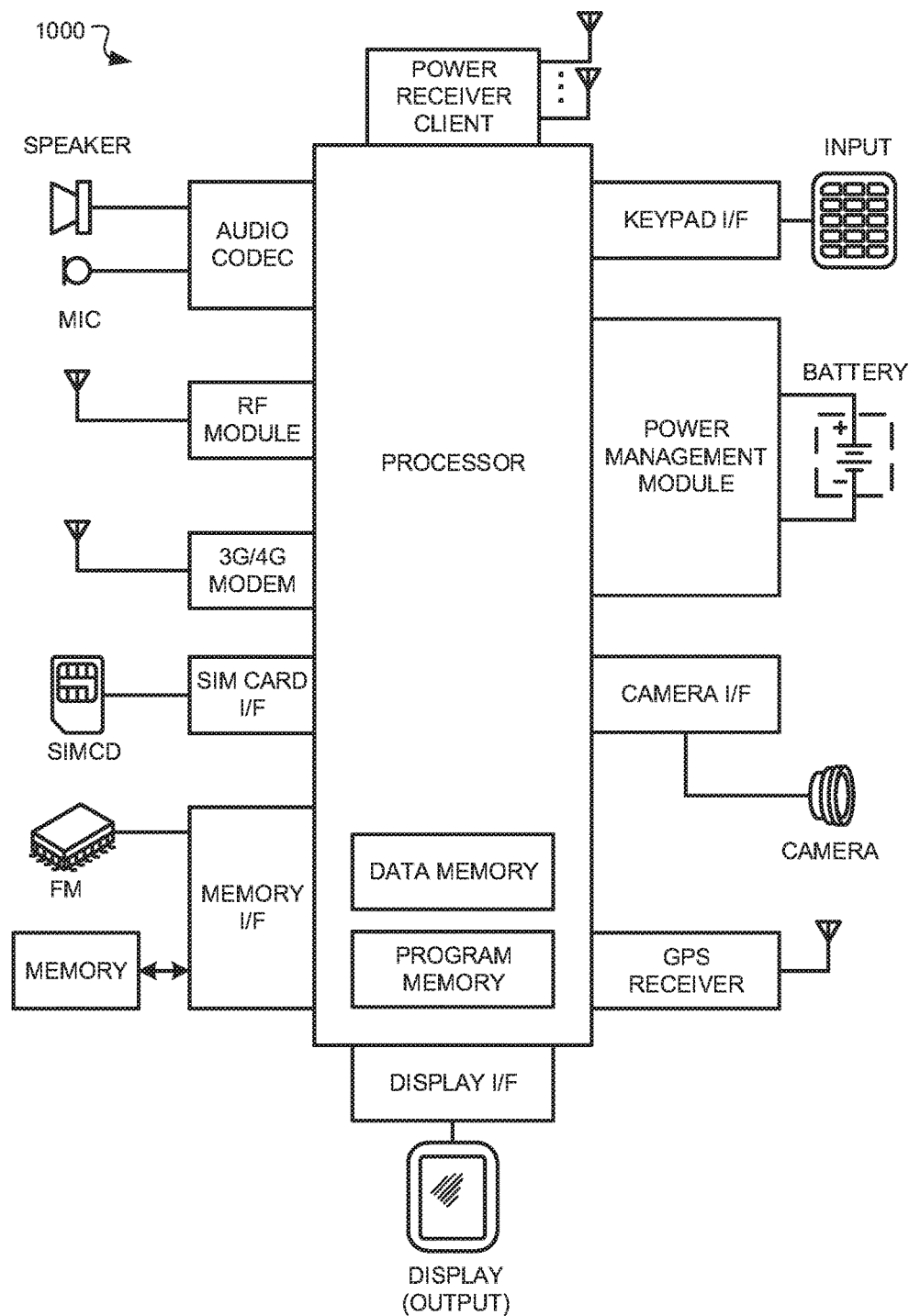
FIG. 10 depicts a block diagram illustrating example components of a representative mobile device or tablet computer with one or more wireless power receiver clients in the form of a mobile (or smart) phone or tablet computer device, according to some embodiments.

FIG. 10 depicts a block diagram illustrating example components of a representative mobile device or tablet computer 1000 with a wireless power receiver or client in the form of a mobile (or smart) phone or tablet computer device, according to an embodiment. Various interfaces and modules are shown with reference to FIG. 10, however, the mobile device or tablet computer does not require all of modules or functions for performing the functionality described herein. It is appreciated that, in many embodiments, various components are not included and/or necessary for operation of the category controller. For example, components such as GPS radios, cellular radios, and accelerometers may not be included in the controllers to reduce costs and/or complexity. Additionally, components such as ZigBee radios and RFID transceivers, along with antennas, can populate the Printed Circuit Board.

The wireless power receiver client can be a power receiver client 103 of FIG. 1, although alternative configurations are possible. Additionally, the wireless power receiver client can include one or more RF antennas for reception of power and/or data signals from a power transmission system, e.g., wireless power transmission system 101 of FIG. 1.

Figure 11:
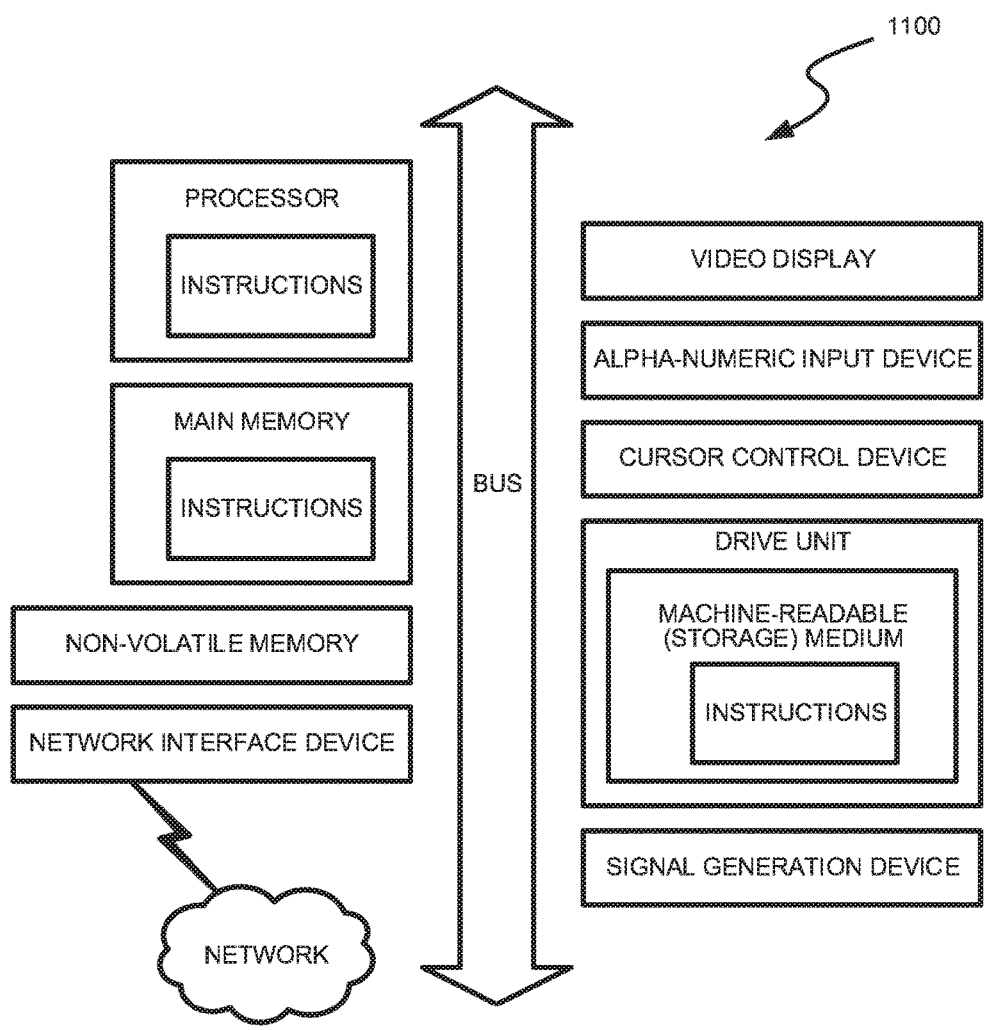
FIG. 11 depicts a diagrammatic representation of a machine, in the example form, of a computer system within which a set of instructions, for causing the machine to perform any one or more of the methodologies discussed herein, may be executed.

FIG. 11 depicts a diagrammatic representation of a machine, in the example form, of a computer system within which a set of instructions, for causing the machine to perform any one or more of the methodologies discussed herein, may be executed.

In the example of FIG. 11, the computer, system includes a processor, memory, non-volatile memory, and an interface device. Various common components (e.g., cache memory) are omitted for illustrative simplicity. The computer system 1100 is intended to illustrate a hardware device on which any of the components depicted in the example of FIG. 1 (and any other components described in this specification) can be implemented. For example, the computer system can be any radiating object or antenna array system. The computer system can be of any applicable known or convenient type. The components of the computer system can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for lame amounts of data. Some of this data is often written, by a direct memory access process, into memory during execution of software in the computer 1300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A wireless power transceiver apparatus comprising:
   one or more antennas;
   a wireless power receiver client configured to:
      direct at least one of the one or more antennas to receive wireless power transmitted by a retrodirective wireless power transmission system, process the wireless power, and provide at least a first portion of the wireless power to an electronic device associated with the wireless power transceiver apparatus;
      determine if a rate at which the wireless power is being received from the retrodirective wireless power transmission system is greater than a threshold value, wherein the threshold value is at least greater than a minimum rate required to maintain operation of the electronic device; and
      when the rate at which wireless power is being received is greater than the threshold value, broadcast a power sharing availability message;
   retransmission control circuitry configured to direct at least one of the one or more antennas to retransmit at least a second portion of the wireless power to a second electronic device.

2. The wireless power transceiver apparatus of claim 1, wherein the retransmission control circuitry is further configured to:
   measure the rate at which wireless power is being received from the retrodirective wireless power transmission system.

3. The wireless power transceiver apparatus of claim 1, wherein the retransmission control circuitry is configured to operate in a wireless power extension mode when the second electronic device is outside of a range of the retrodirective wireless power transmission system.

4. The wireless power transceiver apparatus of claim 1, wherein the retransmission control circuitry is configured to operate in a supplemental power mode when the second electronic device is within range of the retrodirective wireless power transmission system.

5. The wireless power transceiver apparatus of claim 1, wherein the retransmission control circuitry is further configured to:
   control phase settings or power settings for the one or more antennas.

6. The wireless power transceiver apparatus of claim 1, wherein the retransmission control circuitry is further configured to:
   generate a power sharing response indicating configuration information for receiving wireless power in response to receiving a power sharing request.

7. The wireless power transceiver apparatus of claim 1, wherein the retransmission control circuitry is embedded within a housing of the electronic device.

8. The wireless power transceiver apparatus of claim 1, wherein the one or more antennas comprise a power transmission array.

9. An electronic device comprising:
   one or more antennas;
   an energy storage apparatus; and
   a wireless power receiver client configured to:
      direct at least one of the one or more antennas to receive and process wireless power transmitted by a retrodirective wireless power transmission system in a wireless power delivery environment, and provide the wireless power to the energy storage apparatus;

determine if a rate at which the wireless power is being received from the retrodirective wireless power transmission system is greater than a threshold value, wherein the threshold value is at least greater than a minimum rate required to maintain operation of the electronic device;

when the rate at which wireless power is being received is greater than the threshold value, broadcast a power sharing availability message; and direct at least one of the one or more antennas to retransmit at least a second portion of the wireless power to a second electronic device responsive to receiving a power sharing response from the second electronic device.

10. The electronic device of claim 9, wherein the power receiver client is further configured to detect that the electronic device is outside of a range of the retrodirective wireless power transmission system.

11. The electronic device of claim 9, wherein the power receiver client is further configured to detect that the electronic device is at or near a range of the retrodirective wireless power transmission system.

12. The electronic device of claim 9, wherein the power receiver client is further configured to generate and send a power sharing response indicating configuration information for receiving wireless power in response to receiving a power sharing request.

13. The electronic device of claim 9, wherein the power receiver client is further configured to operate in a wireless power extension mode when the second electronic device is outside of a range of the retrodirective wireless power transmission system.

14. The electronic device of claim 9, wherein the power receiver client is further configured to operate in a supplemental power mode when the second electronic device is within range of the retrodirective wireless power transmission system.

15. A method of operating a wireless power transceiver to wirelessly retransmit received wireless power, the method comprising:

receiving wireless power from a retrodirective wireless power transmission system in a wireless power delivery environment;

processing the wireless power;

providing at least a first portion of the wireless power to an electronic device associated with the wireless power transceiver;

determining that a rate at which the wireless power is being received from the retrodirective wireless power transmission system is greater than a threshold value, wherein the threshold value is at least greater than a minimum rate required to maintain operation of the electronic device;

broadcasting a power sharing availability message responsive to determining the rate is greater than the threshold value; and retransmitting at least a second portion of the wireless power to a second electronic device responsive to receiving a power sharing response from the second electronic device.

16. The method of claim 15, further comprising:
measuring the rate at which wireless power is being received from the retrodirective wireless power transmission system.

17. The method of claim 16, wherein the retrodirective wireless power transmission system has a wireless power transmission range in the wireless power delivery environment.

18. The method of claim 15, further comprising:
generating a power sharing response indicating configuration information for receiving wireless power from a third electronic device in response to receiving a power sharing request from the third electronic device.

19. The method of claim 15, wherein the wireless power transceiver operates in a wireless power extension mode when the second electronic device is outside of a range of the retrodirective wireless power transmission system.

20. The method of claim 15, wherein the wireless power transceiver operates in a supplemental power mode when the second electronic device is within range of the retrodirective wireless power transmission system.

* * * * *

UNITED STATES PATENT AND TRADEMARK OFFICE
CERTIFICATE OF CORRECTION

PATENT NO. : 10,256,670 B2
APPLICATION NO. : 15/094079
DATED : April 9, 2019
INVENTOR(S) : Hatem Zeine et al.

Page 1 of 1

It is certified that error appears in the above-identified patent and that said Letters Patent is hereby corrected as shown below:

In the Specification

Column 5, Line 21, after "phone," insert --a--

Column 12, Line 7, delete "antenna as" and insert --antennas--

Column 15, Line 64, delete "lame" and insert --large--

Column 16, Line 19, after "registers)" insert --when--

Signed and Sealed this
Tenth Day of September, 2019

Andrei Iancu
*Director of the United States Patent and Trademark Office*